(12) United States Patent
Chang

(10) Patent No.: US 9,579,812 B2
(45) Date of Patent: Feb. 28, 2017

(54) DISPOSABLE CARVING BLADE

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 124 days.

(21) Appl. No.: 14/098,805

(22) Filed: Dec. 6, 2013

(65) Prior Publication Data

US 2015/0158193 A1 Jun. 11, 2015

(51) Int. Cl.
| | | |
|---|---|---|
| *B26D 1/00* | (2006.01) | |
| *B26D 1/45* | (2006.01) | |
| *B26D 3/08* | (2006.01) | |
| *B26D 7/26* | (2006.01) | |
| *B44B 11/02* | (2006.01) | |
| *B23C 5/10* | (2006.01) | |
| *B23C 5/20* | (2006.01) | |

(52) U.S. Cl.
CPC ............ *B26D 1/0006* (2013.01); *B23C 5/109* (2013.01); *B23C 5/207* (2013.01); *B26D 1/45* (2013.01); *B26D 3/08* (2013.01); *B26D 7/2614* (2013.01); *B44B 11/02* (2013.01); *B23C 2200/0433* (2013.01); *B26D 2001/006* (2013.01); *Y10T 83/9457* (2015.04)

(58) Field of Classification Search
CPC B25D 3/00; B25D 2222/42; B25D 2250/275; B25D 2250/071; B25D 2250/111; B25D 2250/075; Y10T 29/49826; F42B 6/08; B23B 27/1662; B25G 1/105; B26B 5/00
USPC .... 83/831, 652, 837, 854, 848–851; 407/54, 407/66, 94, 99; 7/167, 166, 127, 168; 30/167, 337, 168, 167.1, 167.2, 172, 352, 30/353, 355, 315, 357, 356, 344; 29/428; D32/46; D8/47, 14, 15; 473/583; 15/236.01, 236.05, 245
See application file for complete search history.

(56) References Cited

U.S. PATENT DOCUMENTS

| | | | | |
|---|---|---|---|---|
| 797,840 | A * | 8/1905 | Choate | A47L 13/24 |
| | | | | 172/372 |
| 925,259 | A * | 6/1909 | Ziegler | A46B 7/04 |
| | | | | 15/145 |
| 1,259,944 | A * | 3/1918 | Welch | A01B 1/08 |
| | | | | 172/371 |
| 1,829,499 | A * | 10/1931 | Boos | 30/330 |
| 2,732,620 | A * | 1/1956 | Gibbs | E04D 15/04 |
| | | | | 30/299 |
| 4,411,320 | A * | 10/1983 | Hass | 172/13 |
| 5,027,512 | A * | 7/1991 | Andrews | 30/169 |
| D328,693 | S * | 8/1992 | Ansel | D8/11 |

(Continued)

*Primary Examiner* — Ghassem Alie
(74) *Attorney, Agent, or Firm* — Rosenberg, Klein & Lee

(57) ABSTRACT

A disposable carving blade contains a central hole defined at a central position thereof, a first central line passing through the central position thereof, a right cutting rim formed on a first peripheral side thereof and a left cutting rim formed on a second peripheral side thereof. The right cutting rim is connected with the left cutting rim to form a V-shaped portion, and the V-shaped portion includes a cutting edge defined on a distal end thereof. An intersection point of the right cutting rim on the first peripheral side of the disposable carving blade and the left cutting rim on the second peripheral side of the disposable carving blade is adjacent to the first central line, and a distance between the intersection point and the first central line is a first eccentric value.

4 Claims, 10 Drawing Sheets

(56) References Cited

U.S. PATENT DOCUMENTS

| | | | | |
|---|---|---|---|---|
| 5,201,747 | A * | 4/1993 | Mastel | A61F 9/0133 |
| | | | | 30/353 |
| 5,636,845 | A * | 6/1997 | Newnam | 473/583 |
| 5,964,299 | A * | 10/1999 | Padgett | A01G 3/06 |
| | | | | 172/13 |
| 6,629,985 | B1 * | 10/2003 | Kiehne | A61B 17/3213 |
| | | | | 30/162 |
| 9,009,981 | B2 * | 4/2015 | Quimby et al. | 30/351 |
| 2008/0189957 | A1 * | 8/2008 | Kasper | 30/167 |

* cited by examiner

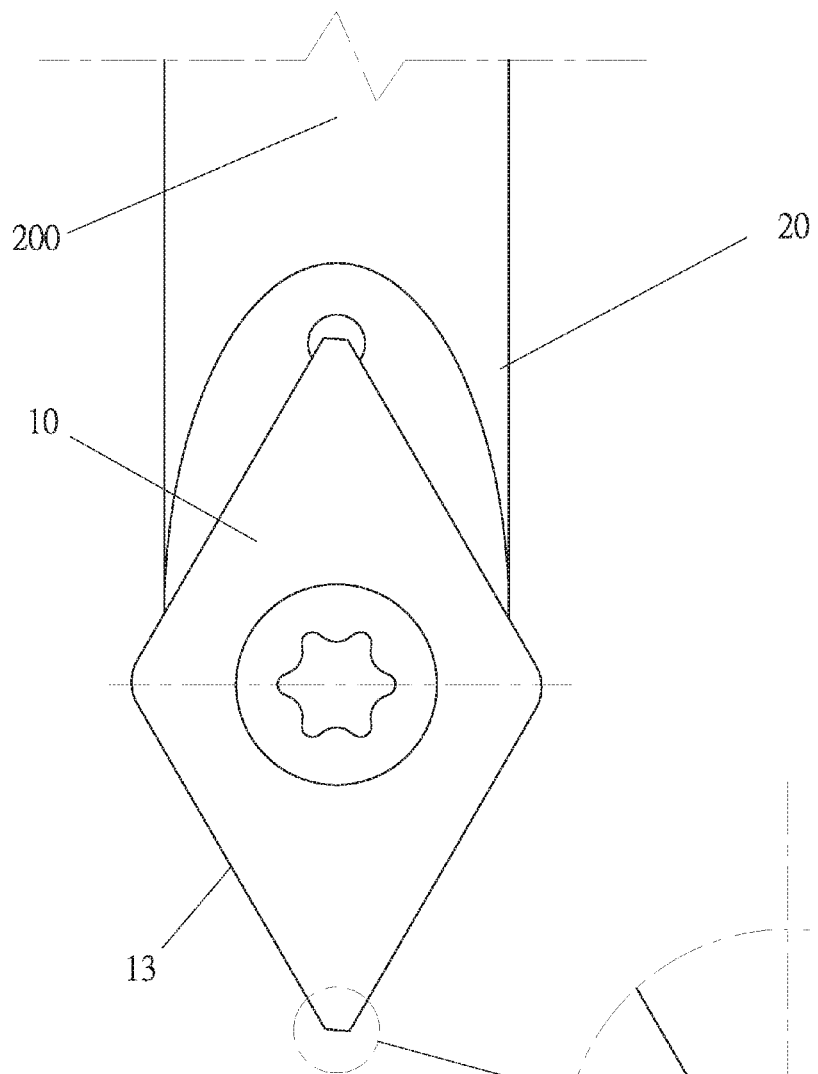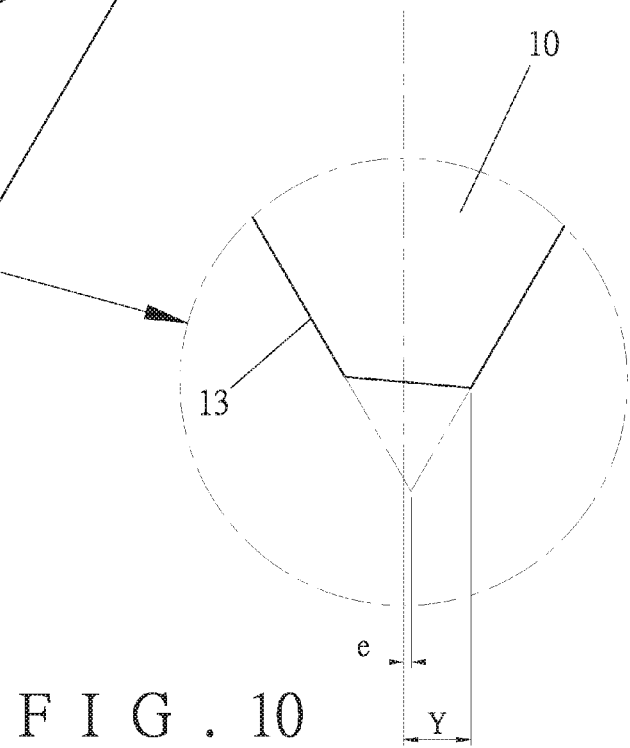
FIG. 9
FIG. 10

DISPOSABLE CARVING BLADE

FIELD OF THE INVENTION

The present invention relates to a carving cutter, and more particular to a disposable carving blade.

BACKGROUND OF THE INVENTION

A conventional carving cutter is applied to carve letters, images or patterns on a metal workpiece. With reference to FIGS. 13 to 15, a carving cutter 30 is made of carbide material and contains a cutter arbor 31 and a cutting portion 32, wherein the cutting portion 32 is comprised of a flatly top surface 321 located at a first central line 320 of the cutting portion 32, a right cutting rim 322, a left cutting rim 323, and a cutting edge 324 arranged at five degrees relative to a level. FIG. 15 is an amplified view of the cutting portion 32, a distance between the first central line 320 of the cutting portion 32 and a second central line 310 of the cutter arbor 31 is an eccentric value e, and a width radius Y is defined between a distal end of the cutting edge 324 and the second central line 310, a slot width cut by the carving cutter 30 is 2Y. The carving cutter 30 is used to perform a cutting of little volume based on a designed eccentric value e, so only the right cutting rim 322 and the cutting edge 324 can be used to carve the workpiece.

The eccentric value e is selectively changed to cooperate with the width radiuses Y, wherein the eccentric value e is ranged within 0.01 to 0.06 mm and the width radius Y is ranged within 0.05 to 0.3 mm. The matching condition between the eccentric value e and the width radius Y is quite strict. In general, when e=0.01, Y=0.05; when e=0.02, Y=0.1; when e=0.03, Y=0.15; when e=0.04, Y=0.2; when e=0.05, Y=0.25; and when e=0.06, Y=0.3. Accordingly, when a mismatch between the eccentric value e and the width radiuses Y occurs, the cutting edge 34 is used in an excessively eccentric condition, thereby carving the workpiece imprecisely.

As shown in FIG. 16, when the carving cutter 30 is used in a condition of e=0.03 and Y=0.05 (i.e., the slot width=0.1 mm), due to the eccentric value e is over a set value, the cutting edge 324 is located at a right side of the second central line 310 of the cutter arbor 31, such that the left cutting rim 323 extends to the right side of the second central line 310, hence the carving cutter 30 cannot cut the workpiece smoothly, thus causing burrs or damaging the cutting edge 324. In other words, when a user desires to carve slots with various slot widths, the user has to buy multiple carving cutters 30 of which eccentric values e (or width radiuses Y) are different.

Furthermore, as illustrated in FIGS. 13 to 15, when the cutting edge 324 and the right cutting rim 322 are not sharp, they are ground by a grinding machine, but a size of the cutting edge 324 is quite small, so it cannot be ground exactly. In addition, the right cutting rim 322 and the left cutting rim 323 both have to be ground precisely, or the eccentric value e defined between the first central line 320 of the cutting portion 32 and the second central line 310 of the cutter arbor 31 changes so that the width radius Y changes as well. For instance, when the eccentric value e increases to over the set value, the cutting edge 324 is located at the right side of the second central line 310, and the left cutting rim 323 extends to the right side of the second central line 310 (as shown in FIG. 16), such that the carving cutter 30 cannot cut the workpiece smoothly, thereby causing improper cutting precision.

FIG. 17 shows a conventional disposable carving cutter 40, which contains a cutter arbor 41 and a holder 42 fixed on a distal end of the cutter arbor 41. The holder 42 has a screw orifice 421, a distance between a central position of the screw orifice 421 and a first central line 400 of the cutter arbor 41 is an eccentric value e. The screw orifice 421 of the holder 42 is provided to lock a disposable carving blade 50. The disposable carving blade 50 is in a rhombus shape and includes a right cutting rim 51 and a left cutting rim 52 between which is defined a V-shaped portion. The V-shapes portion has a cutting edge 53 formed on a distal end thereof, and the right cutting rim 51 is symmetrical to the left cutting rim 52, wherein an intersection point of distal ends of the right cutting rim 51 and the left cutting rim 52 is located at a second central line 500 of the disposable carving blade 50, and a stepped aperture 54 is defined at central position of the disposable carving blade 50, wherein the stepped aperture 54 corresponds to the screw orifice 421, and the second central line 500 passes through central positions of the screw orifice 421 and the stepped aperture 54. When the disposable carving blade 50 is locked on the holder 42, a distance between a distal end of the cutting edge 53 and the first central line 400 of the cutter arbor 41 is a width radius Y, and only the right cutting rim 51 and the cutting edge 53 can cut workpiece. After the disposable carving blade 50 is dull, it is replaced and no need to be grounded. Nevertheless, a new disposable carving blade 50 has to cooperate with a holder 42 with a fit eccentric value e so that the cutting edge 53 and the left cutting rim 52 cannot rightward move away from the first central line 400. In other words, as the eccentric value e is set on the cutter arbor 41 (i.e. is defined by the relative position between the holder 42 and the cutter arbor 41), when the user replaces the disposable carving blade 50 to adjust the width radius Y, he/she has to replace the cutter arbor 41 at the same time so as to match the eccentric value e with the width radius Y properly, thus increasing use cost.

The present invention has arisen to mitigate and/or obviate the afore-described disadvantages.

SUMMARY OF THE INVENTION

The primary object of the present invention is to provide a disposable carving blade which matches with a cutter arbor that is eccentric or is not eccentric.

Another object of the present invention is to provide a disposable carving blade by which a first eccentric value can be changed by merely replacing the disposable carving blade with another one disposable carving blade without replacing the cutter arbor so as to save use cost.

To obtain the above objective, a disposable carving blade provided by the present invention contains a central hole defined at a central position thereof, a first central line passing through the central position thereof, a right cutting rim formed on a first peripheral side thereof and a left cutting rim formed on a second peripheral side thereof, wherein the right cutting rim is connected with the left cutting rim to form a V-shaped portion, the V-shaped portion includes a cutting edge defined on a distal end thereof.

Preferably, the disposable carving blade also contains a right cutting rim arranged on a third peripheral side thereof symmetrical and parallel to the right cutting rim on the first peripheral side of the disposable carving blade and contains a left cutting rim arranged on a fourth peripheral side thereof symmetrical and parallel to the left cutting rim on the second peripheral side of the disposable carving blade, wherein a distance between the two left cutting rims is a first rim spacing value, and a distance between the two right cutting rims is a second rim spacing value.

An intersection point of the right cutting rim on the first peripheral side of the disposable carving blade and the left cutting rim on the second peripheral side of the disposable carving blade is adjacent to the first central line, and a distance between the intersection point and the first central line is a first eccentric value, a width radius is defined between a distal end of the cutting edge and the first central line, and the eccentric value is set based on using requirement.

Preferably, a length of the right cutting rim is not symmetrical to that of the left cutting rim, and the intersection point is adjacent to the first central line, such that the first rim spacing value and the second rim spacing value is different. The first eccentric value changes according to the difference between the first rim spacing value and the second rim spacing value.

BRIEF DESCRIPTION OF THE DRAWINGS

FIG. 9 is a plan view showing the first eccentric value of the disposable carving blade being 0.03 mm according to the preferred embodiment of the present invention.

FIG. 10 is an amplified plan view of a part of FIG. 9.

DETAILED DESCRIPTION OF THE PREFERRED EMBODIMENTS

Figure 1:
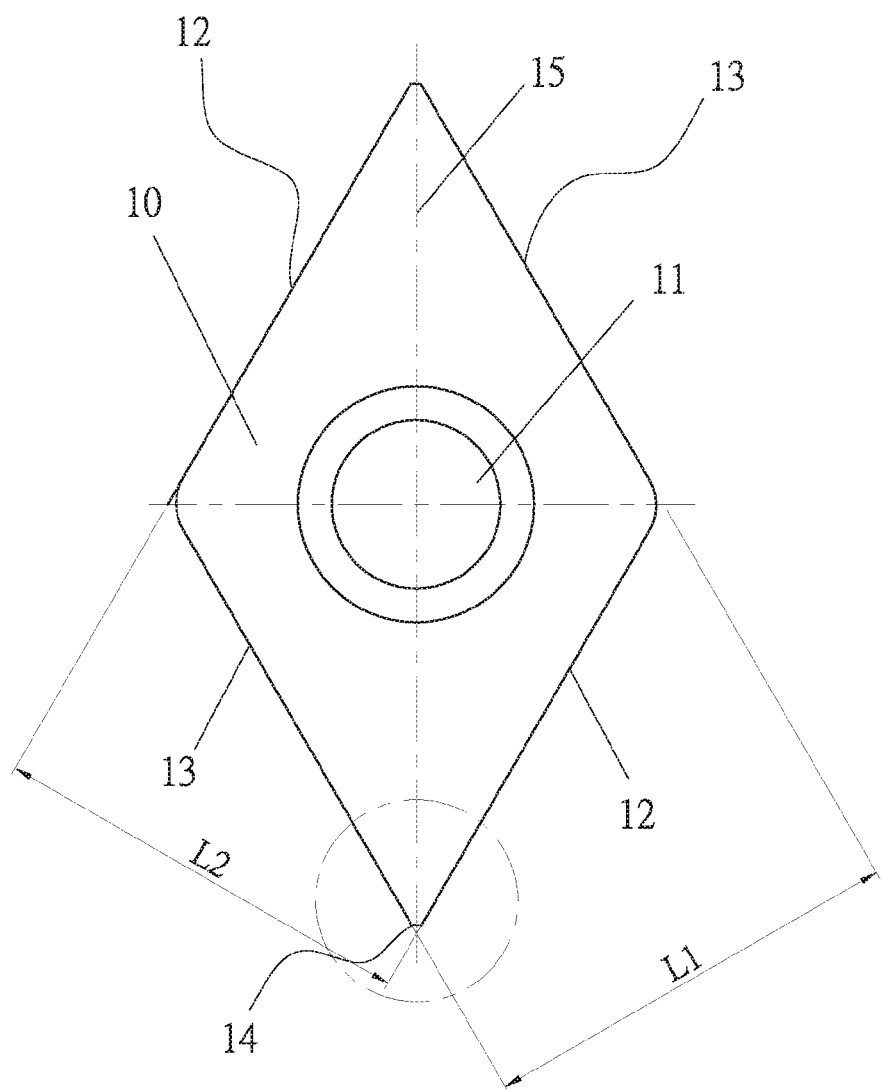
FIG. 1 is a front plan view showing a disposable carving blade according to a preferred embodiment of the present invention.
Figure 2:
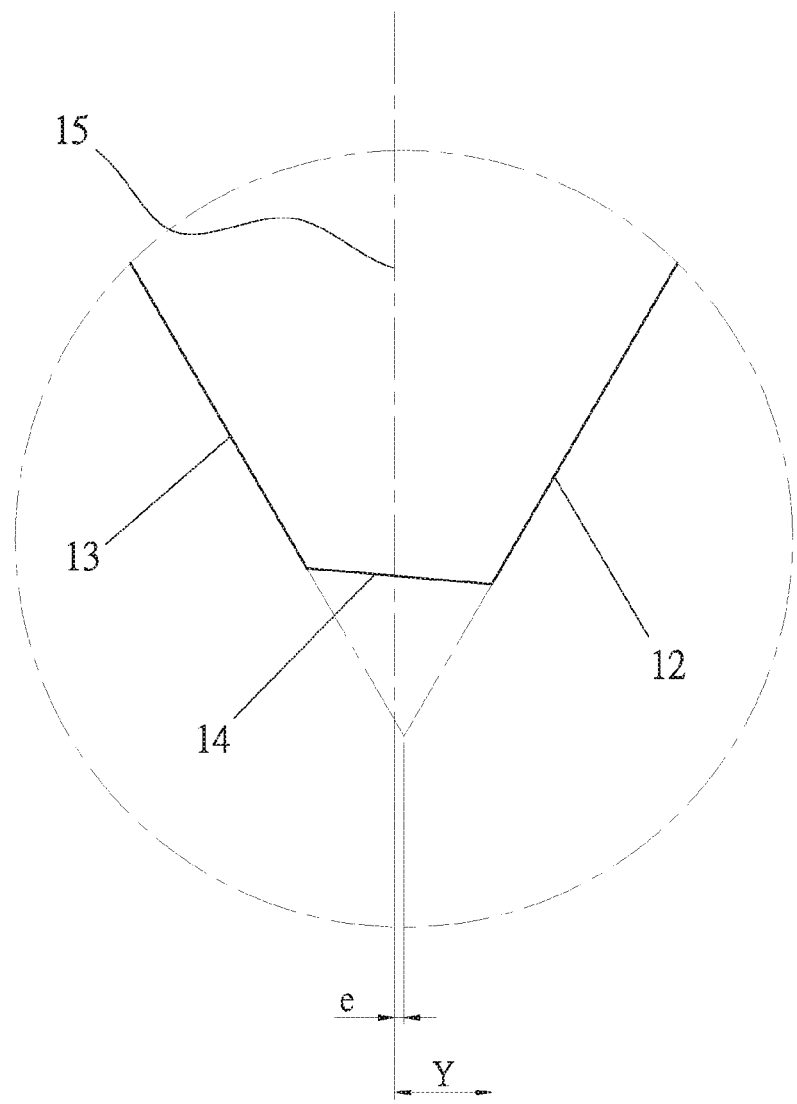
FIG. 2 is an amplified plan view of a cutting edge of the disposable carving blade according to the preferred embodiment of the present invention.

With reference to FIGS. 1-2, a disposable carving blade 10 comprises a central hole 11 defined at a central position thereof, a first central line 15 passing through the central position thereof, a right cutting rim 12 formed on a first peripheral side thereof and a left cutting rim 13 formed on a second peripheral side thereof, wherein the right cutting rim 12 is connected with the left cutting rim 13 to form a V-shaped portion, the V-shaped portion includes a cutting edge 14 defined on a distal end thereof. The disposable carving blade 10 also comprises another right cutting rim 12 arranged on a third peripheral side thereof symmetrical and parallel to the right cutting rim 12 on the first peripheral side of the disposable carving blade 10 and comprises another left cutting rim 13 arranged on a fourth peripheral side thereof symmetrical and parallel to the left cutting rim 13 on the second peripheral side of the disposable carving blade 10. A distance between the two left cutting rims 13 is a first rim spacing value L1, and a distance between the two right cutting rims 12 is a second rim spacing value L2. An intersection point of the right cutting rim 12 on the first peripheral side of the disposable carving blade 10 and the left cutting rim 13 on the second peripheral side of the disposable carving blade 10 is adjacent to the first central line 15, and a distance between the intersection point and the first central line 15 is a first eccentric value e, a width radius Y is defined between a distal end of the cutting edge 14 and the first central line 15, and the first eccentric value e is set based on using requirement. Since a length of each right cutting rim 12 is not symmetrical to that of each left cutting rim 13, and the intersection point is not located at the first central line 15 (i.e., is adjacent to the first central line 15), the first rim spacing value L1 defined between the two left cutting rims 13 is different from the second rim spacing value L2 defined between the two right cutting rims 12.

In more detail, the disposable carving blade 10 is substantially formed in a parallelogram shape, and when the intersection point of the right cutting rim 12 on the first peripheral side of the disposable carving blade 10 and the left cutting rim 13 on the second peripheral side of the disposable carving blade 10 is located beside the right side of the first central line 15, the length of the right cutting rim 12 is shorter than that of the left cutting rim 13. That is, the second rim spacing value L2 defined between the two right cutting rims 12 is larger than the first rim spacing value L1 defined between the two left cutting rims, and when a difference between the first rim spacing value L1 and the second rim spacing value L2 changes, the first eccentric value e changes accordingly.

Figure 3:
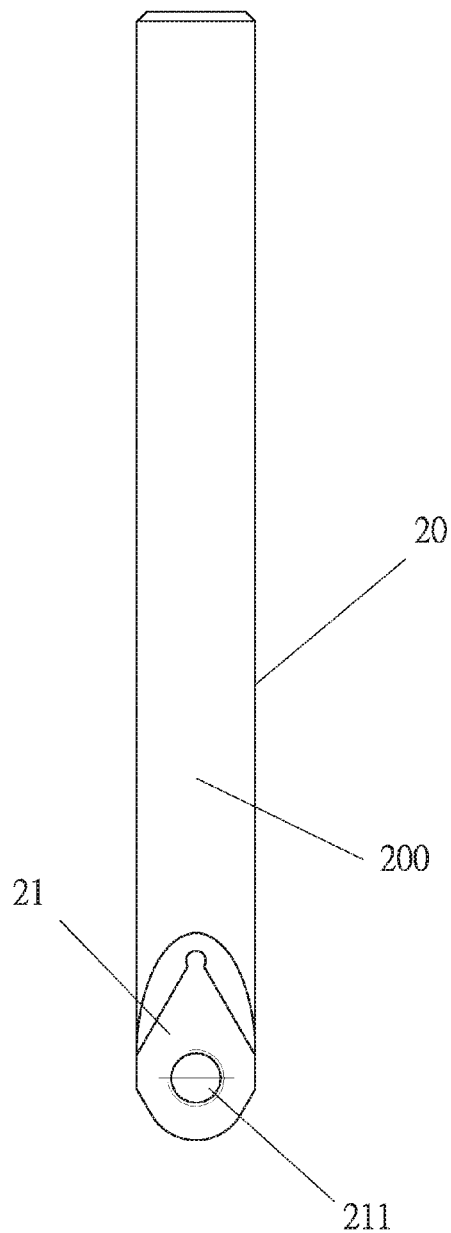
FIG. 3 is a plan view showing a cutter arbor according to the preferred embodiment of the present invention.
Figure 4:
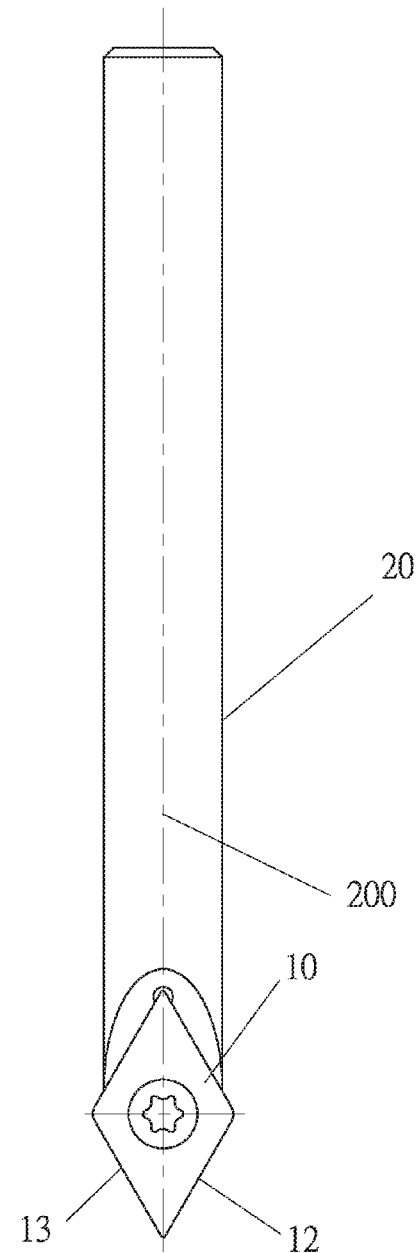
FIG. 4 is a plan view showing the assembly of the cutter arbor and the disposable carving blade according to the preferred embodiment of the present invention.

Referring to FIGS. 3 and 4, a cutter arbor 20 includes a holder 21 on a distal end thereof and a second central line 200 defined thereon. The holder 21 has a screw orifice 211 formed at a central position thereof, wherein the second central line 200 of the cutter arbor 20 passes through a central point of the screw orifice 211 of the holder 21, i.e., the holder 21 is not eccentric relative to the cutter arbor 20. The central hole 11 of the disposable carving blade 10 corresponds in shape to the screw orifice 211 of the holder 21 so that the disposable carving blade 10 is locked in the screw orifice 211 of the holder 21. Thereby, the first eccentric value e is produced by merely arranging the right cutting rim 12 asymmetrically to the left cutting rim 13 of the disposable carving blade 10, and when a length of each right cutting rim 12 and that of each left cutting rim 13 are changed, the first eccentric value e is also changed.

Figure 5:
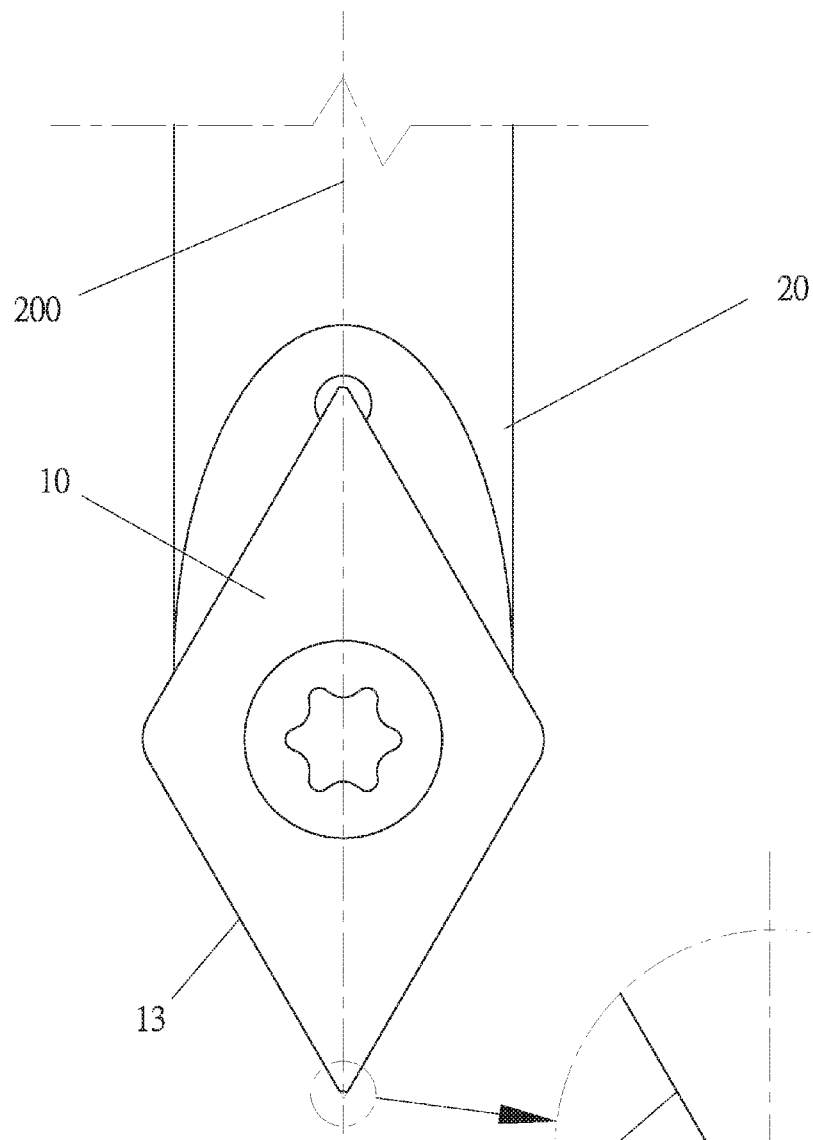
FIG. 5 is a plan view showing a first eccentric value of the disposable carving blade being 0.01 mm according to the preferred embodiment of the present invention.
Figure 6:
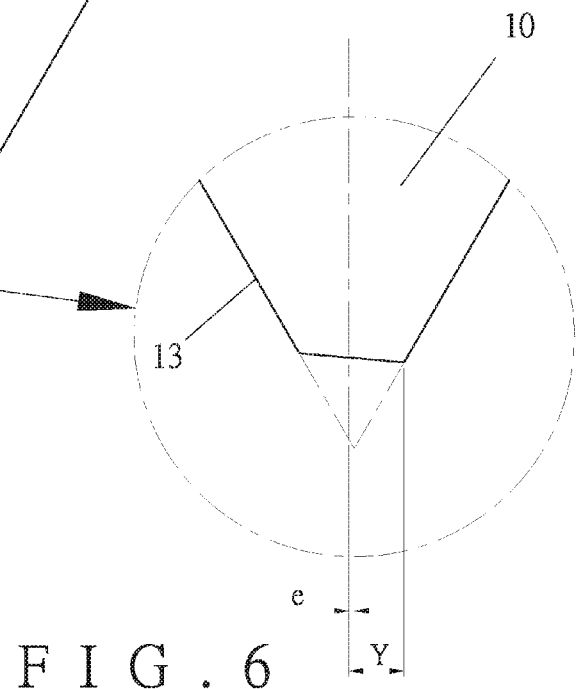
FIG. 6 is an amplified plan view of a part of FIG. 5.

In an embodiment, as shown in FIGS. 5 and 6, the first eccentric value e of the disposable carving blade 10 is 0.01 mm, the width radius Y is 0.05 mm, and a width of a slot cut by the disposable carving blade 10 is 0.1 mm, wherein the disposable carving blade 10 is locked on the holder 21 of the cutter arbor 20. In this embodiment, the second central line 200 of the cutter arbor 20 passes through the central point of the screw orifice 211 of the holder 21, i.e., the holder 21 is not eccentric relative to the cutter arbor 20. It is noted that the left cutting rim 13 on the second peripheral side of the disposable carving blade 10 does not extend to the right side of the second central line 200, such that the left cutting rim 13 cannot interfere a cutting process. It is preferable that when the cutting edge 14 becomes dull, the disposable carving blade 10 is rotated upside down to cut a workpiece by ways of another cutting edge 14. In addition, a new disposable carving blade 10 is used to replace the dull disposable carving blade 10.

Figure 7:
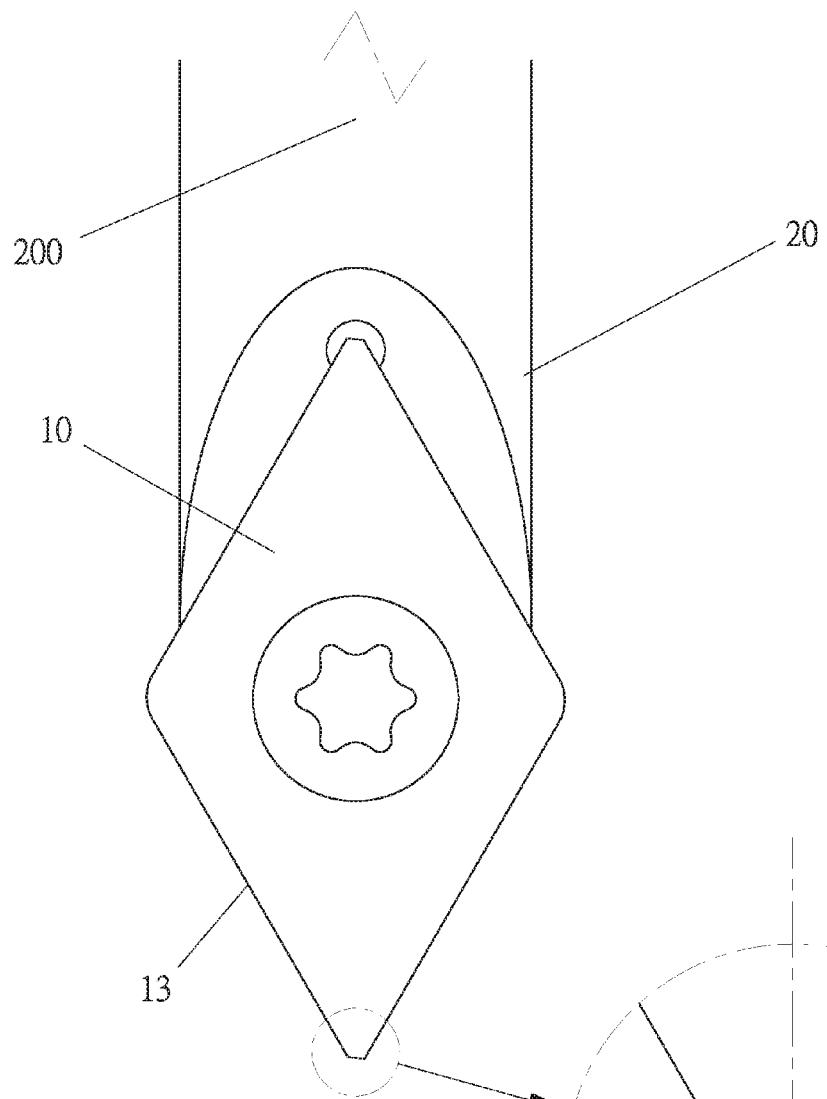
FIG. 7 is a plan view showing the first eccentric value of the disposable carving blade being 0.02 mm according to the preferred embodiment of the present invention.
Figure 8:
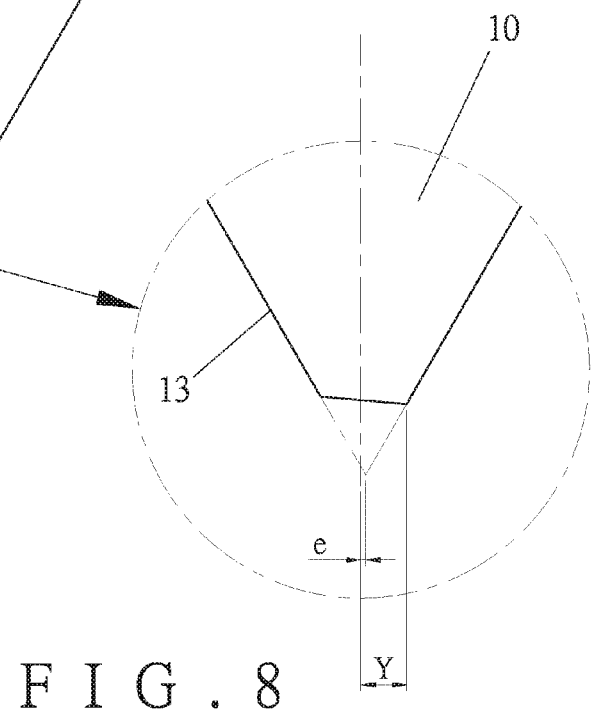
FIG. 8 is an amplified plan view of a part of FIG. 7.

In another embodiment, as illustrated in FIGS. 7 and 8, the first eccentric value e of the disposable carving blade 10 is 0.02 mm, the width radius Y is 0.1 mm, and a width of a slot cut by the disposable carving blade 10 is 0.2 mm, wherein the disposable carving blade 10 is locked on the holder 21 of the cutter arbor 20. In this embodiment, the second central line 200 of the cutter arbor 20 passes through the central point of the screw orifice 211 of the holder 21, i.e., the holder 21 is not eccentric relative to the cutter arbor 20. It is noted that the left cutting rim 13 on the second peripheral side of the disposable carving blade 10 does not extend to the right side of the second central line 200, such that the left cutting rim 13 cannot interfere the cutting process. Preferably, when the cutting edge 14 becomes dull, the disposable carving blade 10 is rotated upside down to cut the workpiece by ways of another cutting edge 14. Moreover, a new disposable carving blade 10 is applied to replace the dull disposable carving blade 10.

In further embodiment, referring to FIGS. 9 and 10, the first eccentric value e of the disposable carving blade 10 is 0.03 mm, the width radius Y is 0.15 mm, and a width of a slot cut by the disposable carving blade 10 is 0.3 mm, wherein the disposable carving blade 10 is locked on the holder 21 of the cutter arbor 20. In this embodiment, the second central line 200 of the cutter arbor 20 passes through the central point of the screw orifice 211 of the holder 21, i.e., the holder 21 is not eccentric relative to the cutter arbor 20. It is noted that the left cutting rim 13 on the second peripheral side of the disposable carving blade 10 does not extend to the right side of the second central line 200, such that the left cutting rim 13 cannot interfere the cutting process. It is preferable that when the cutting edge 14 becomes dull, the disposable carving blade 10 is rotated upside down to cut a workpiece by ways of another cutting edge 14. Furthermore, a new disposable carving blade 10 is served to replace the dull disposable carving blade 10.

Accordingly, as the first eccentric value e is directly defined on the disposable carving blade 10, the user can change the width radius Y as well as the first eccentric value e by merely selecting a desired disposable carving blade 10 without replacing the cutter arbor 20, such that the assembly between the cutter arbor 20 and the disposable carving blade 10 is facilitated. Preferably, the disposable carving blade 10 is manufactured by means of powder metallurgy, so the first eccentric value e is formed directly without being ground, thereby lowering production cost and improving manufacturing accuracy.

Figures 11, 12:
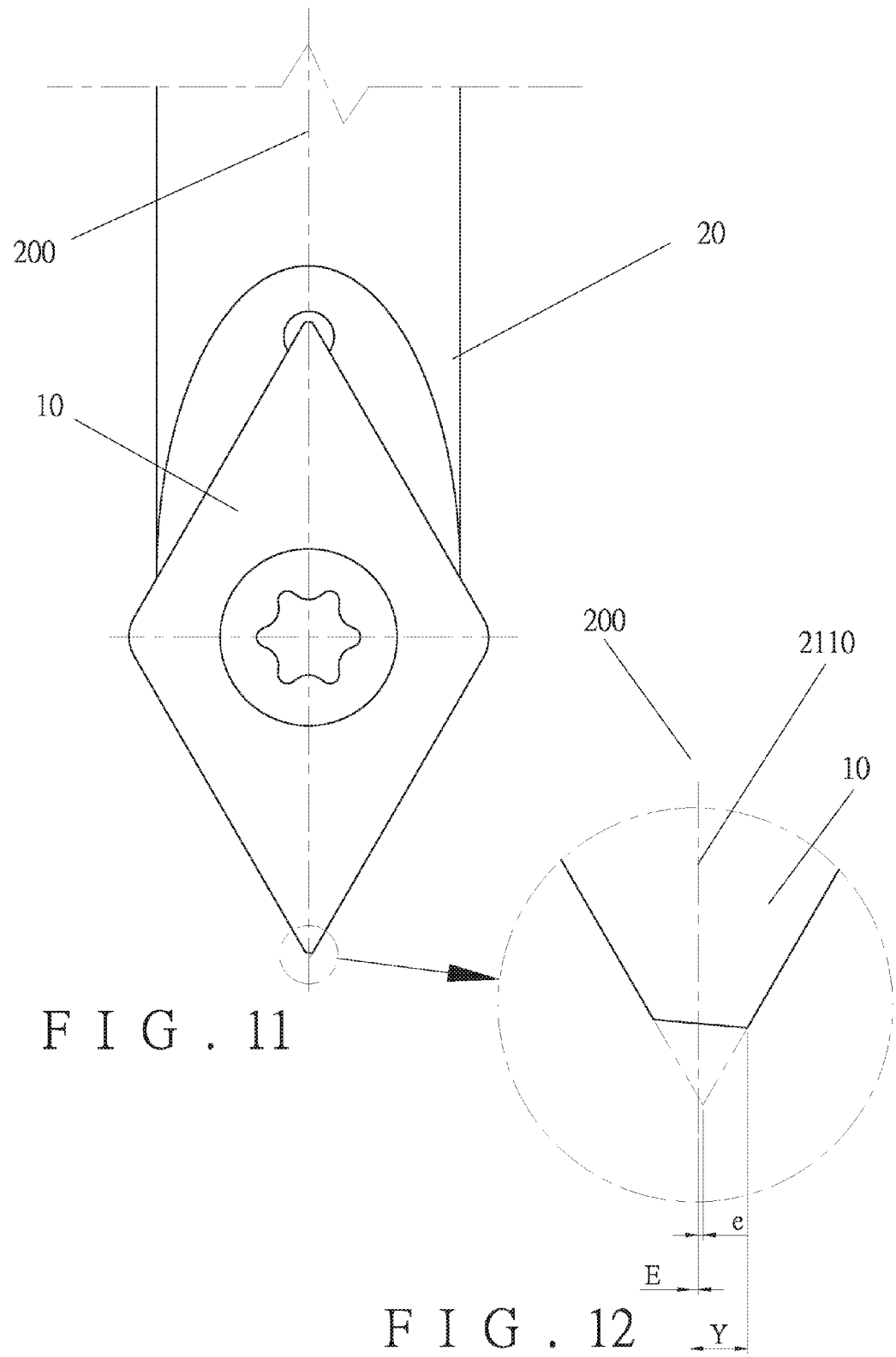
FIG. 11 is a plan view showing the disposable carving blade with the first eccentric value matching with the cutter arbor with a second eccentric value according to the preferred embodiment of the present invention.
FIG. 12 is an amplified plan view of a part of FIG. 11.
Figures 13, 14:
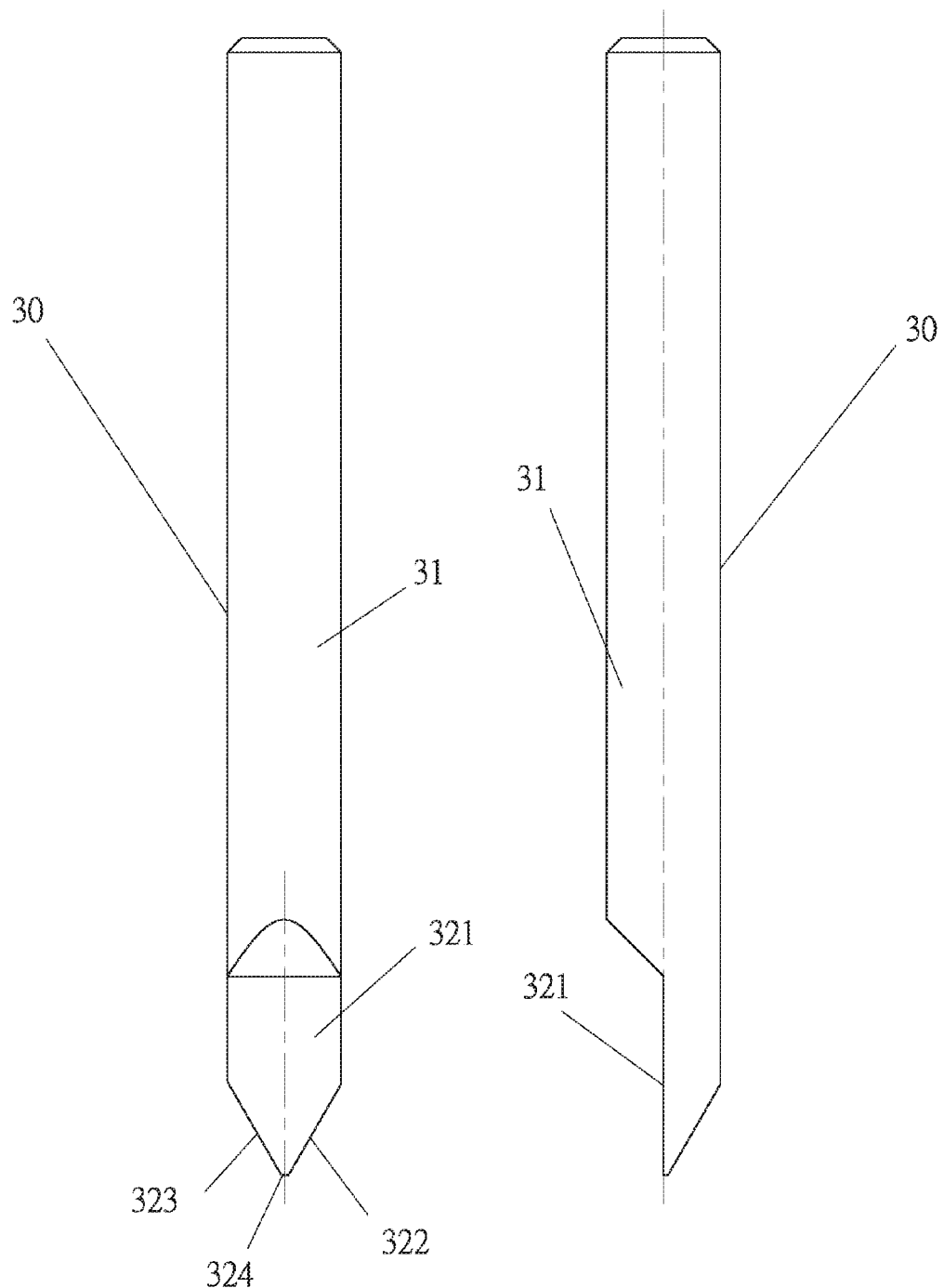
FIG. 13 is a front plan view of a conventional carving cutter.
FIG. 14 is a side plan view of the conventional carving cutter.
Figure 15:
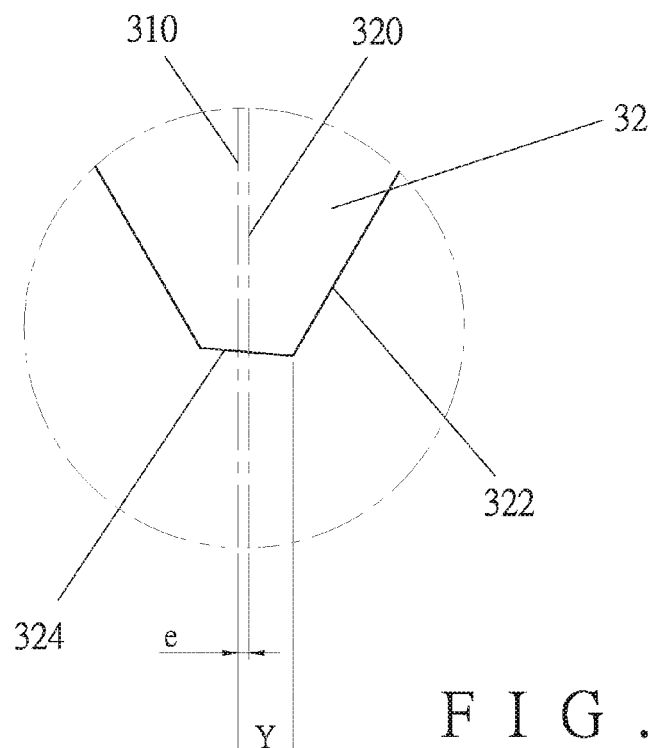
FIG. 15 is an amplified plan view of a part of the conventional carving cutter.
Figure 16:
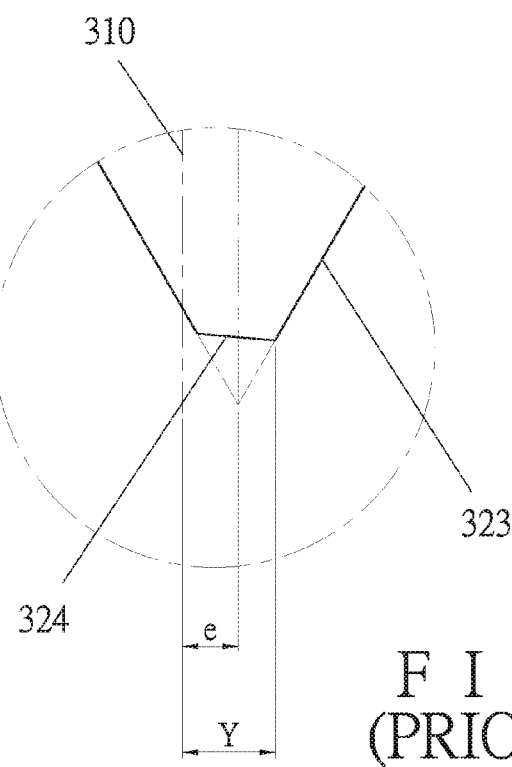
FIG. 16 is a schematic view showing the operation of the conventional carving cutter.
Figure 17:
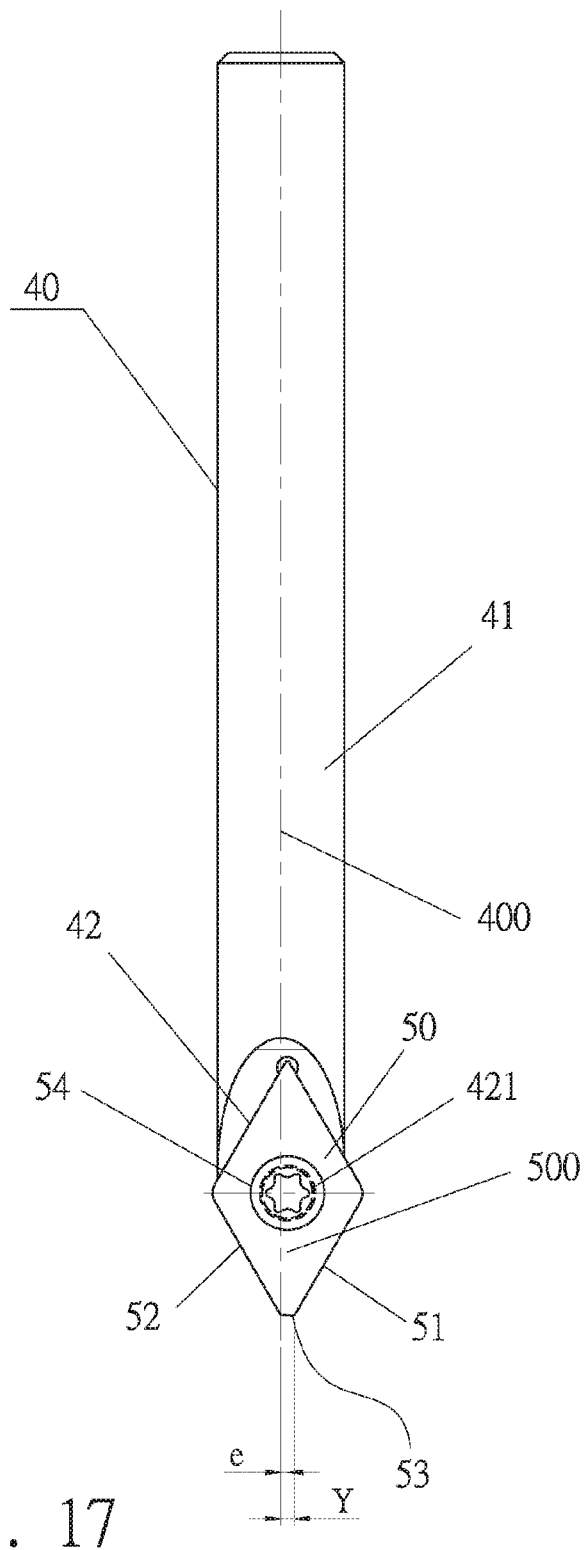
FIG. 17 is a plan view of a conventional disposable carving cutter.

Moreover, referring to FIGS. 11 and 12, the disposable carving blade 10 can also cooperate with another holder 21 which includes a third central line 2110 passing through the central position of the screw orifice 211, and a second eccentric value E is defined between the third central line 2110 and the second central line 200 of the cutter arbor 20. The second eccentric value E is set according to using requirement so as to increase the width radius Y. In other words, the width radius Y can be changed by merely replacing the cutter arbor 20 without replacing the disposable carving blade 10.

Accordingly, by using the disposable carving blade 10 and the cutter arbor 20 of the present invention, the user can merely replace the disposable carving blade 10 or the cutter arbor 20 to achieve various slot widths, thereby saving using cost and avoiding assembling the cutter arbor 20 and the disposable carving blade 10 in different specification.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A disposable carving blade for a carving cutter having a cutter arbor, the cutter arbor having a screw orifice positioned on an axial central line of the arbor, comprising:
a blade body having a substantially parallelogramic contour and being formed with a mounting hole at a central position of the blade body, the blade body being coupled to the cutter arbor by a fastener passing through the mounting hole and into the screw orifice, an angled right cutting rim formed on a first peripheral side of the blade body, and an angled left cutting rim formed on a second peripheral side of the blade body, the angled right and left cutting rims being two adjacent sides of the substantially parallelogramic contoured blade body;
wherein the right cutting rim is configured with the left cutting rim to form a substantially V-shaped portion, the substantially V-shaped portion terminating at a cutting edge defined on a distal end thereof traversing the axial central line of the cutter arbor to extend transversely between the right and left cutting rims, and an intersection point reference cooperatively defined by predetermined angular convergence of a reference line projecting from the right cutting rim on the first peripheral side of the disposable carving blade and another reference line projecting from the left cutting rim on the second peripheral side of the blade body, the intersection point reference further defining a point of intersection with a central line of the blade, the central line of the blade being offset from the axial central line of the cutter arbor at the intersection point reference to be non-coincident therewith, and a distance between the intersection point reference and the axial central line of the cutter arbor defining a first eccentric value with respect to the axis central line of the cutter arbor, wherein a length of the right cutting rim is asymmetrical to that of the left cutting rim.

2. The disposable carving blade as claimed in claim 1, further comprising another right cutting rim arranged on a third peripheral side thereof symmetrical and parallel to the right cutting rim on the first peripheral side of the disposable carving blade, and further comprising another left cutting rim arranged on a fourth peripheral side thereof symmetrical and parallel to the left cutting rim on the second peripheral side of the disposable carving blade, the angled right rim on the third peripheral side of the blade body and the angled left cutting rim on the fourth peripheral side of the blade body being the remaining two adjacent sides of the substantially parallelogramic contoured blade body, wherein a spacing distance between the two left cutting rims is defined by a first line extending between the two left cutting rims and the first line being orthogonal with respect to the two left cutting rims, the spacing distance between the two left cutting rims thereby defining a first rim spacing value, and a spacing distance between the two right cutting rims is defined by a second line extending between the two right cutting rims and the second line being orthogonal with respect to the two right cutting rims, the spacing distance between the two right cutting rims thereby defining a second rim spacing value.

3. The disposable carving blade as claimed in claim 2, wherein the intersection point reference is located beside a right side of the axial central line of the cutter arbor, and the first rim spacing value defined between the two left cutting rims is less than the second rim spacing value defined between the two right cutting rims.

4. The disposable carving blade as claimed in claim 2, wherein the intersection point reference is located beside a left side of the axial central line of the cutter arbor, and the second rim spacing value defined between the two right cutting rims is less than the first rim spacing value defined between the two left cutting rims.

\* \* \* \* \*